United States Patent
Yoon

(10) Patent No.: US 7,600,060 B2
(45) Date of Patent: Oct. 6, 2009

(54) MEMORY SYSTEM AND METHOD FOR SETTING DATA TRANSMISSION SPEED BETWEEN HOST AND MEMORY CARD

(75) Inventor: Jeong-Hyon Yoon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 430 days.

(21) Appl. No.: 11/009,168

(22) Filed: Dec. 10, 2004

(65) Prior Publication Data
US 2005/0132093 A1    Jun. 16, 2005

(30) Foreign Application Priority Data
Dec. 11, 2003    (KR) .................. 10-2003-0090188

(51) Int. Cl.
G06F 3/00    (2006.01)
G06F 5/00    (2006.01)
(52) U.S. Cl. ............................. 710/60; 710/15
(58) Field of Classification Search ............... 710/60, 710/15, 58, 59, 61
See application file for complete search history.

(56) References Cited
U.S. PATENT DOCUMENTS

| | | | |
|---|---|---|---|
| 5,237,676 A * | 8/1993 | Arimilli et al. ............ 710/110 |
| 5,581,708 A | 12/1996 | Iijima |
| 5,798,507 A * | 8/1998 | Kawagishi et al. ......... 235/380 |
| 5,842,039 A | 11/1998 | Hanaway et al. |
| 6,669,487 B1 * | 12/2003 | Nishizawa et al. ......... 439/60 |
| 6,731,688 B1 * | 5/2004 | Johnson ..................... 375/257 |
| 6,973,519 B1 * | 12/2005 | Estakhri et al. ............ 710/104 |
| 6,993,601 B2 * | 1/2006 | Minami et al. ............. 710/38 |
| 7,044,389 B2 * | 5/2006 | Nishizawa et al. ......... 235/492 |
| 7,254,652 B2 * | 8/2007 | Anderson et al. .......... 710/29 |
| 2003/0075609 A1 | 4/2003 | Kim |

FOREIGN PATENT DOCUMENTS

JP    06-314359    11/1994
JP    2001-209773    8/2001

* cited by examiner

*Primary Examiner*—Henry W. H. Tsai
*Assistant Examiner*—Michael Sun
(74) *Attorney, Agent, or Firm*—F. Chau & Associates, LLC

(57) ABSTRACT

A memory system includes a host and an electronic circuit card that can be inserted into the host and electrically connected to the host. If the electronic circuit card is inserted into the host, the host transfers transmission speed information to the electronic circuit card. If transmission speed information received from the host specifies a transmission speed that is identical to a transmission speed of the electronic circuit card, the electronic circuit card transfers a response signal to the host. The host generates a command signal for initializing the electronic circuit card after setting a transmission speed.

11 Claims, 6 Drawing Sheets

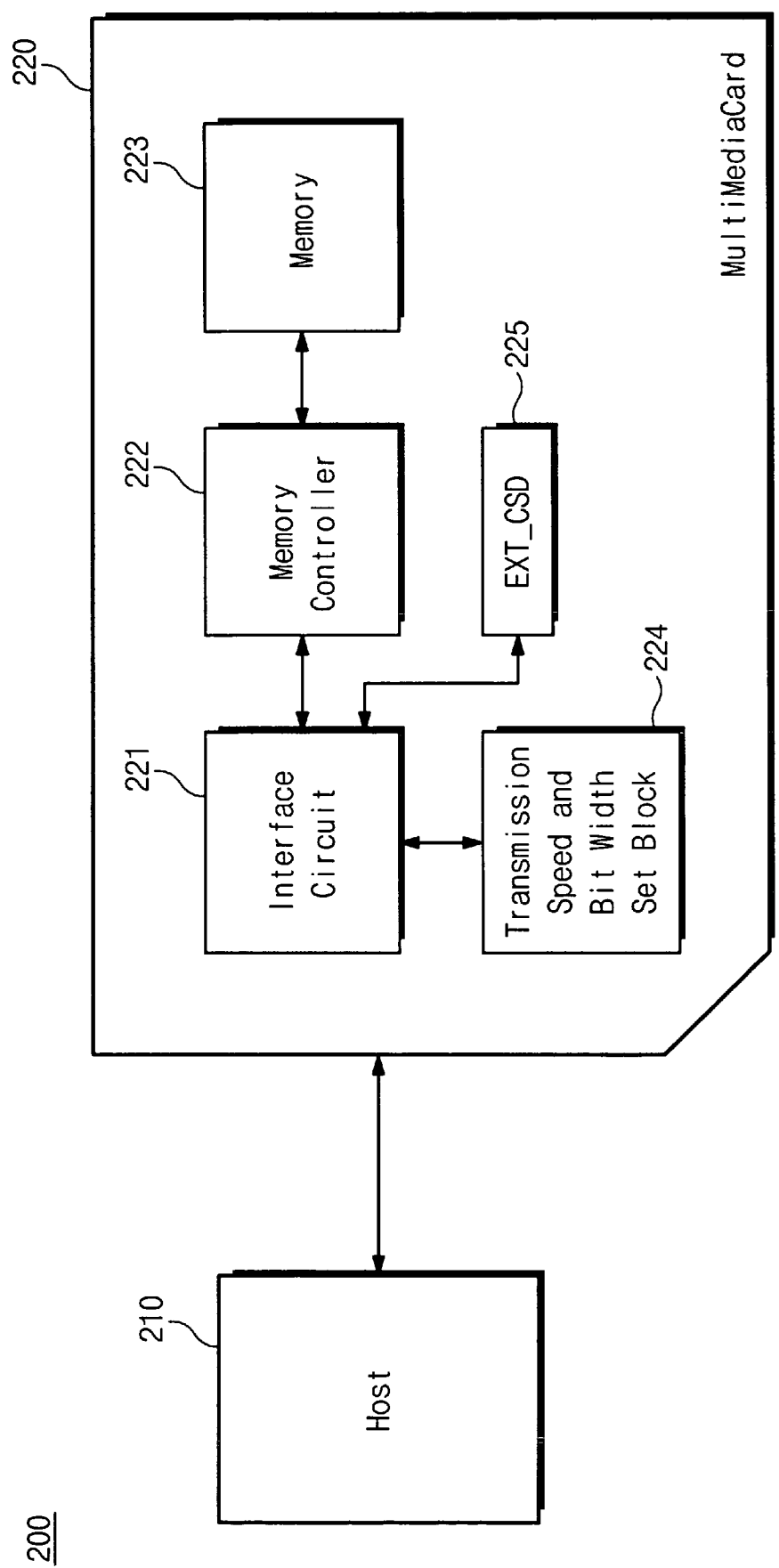

MEMORY SYSTEM AND METHOD FOR SETTING DATA TRANSMISSION SPEED BETWEEN HOST AND MEMORY CARD

This application claims priority from Korean Patent Application No. 2003-90188, filed on Dec. 11, 2003, the contents of which is herein incorporated by reference in its entirety.

BACKGROUND OF THE INVENTION

1. Field of the Invention

The present invention relates to a memory system having a host and an electronic circuit card that can be inserted into the host and electrically connected to the host, and more particularly to a system and method for controlling a transmission speed between the host and electronic circuit card.

2. Discussion of Related Art

Small cards containing non-volatile semiconductor memories have become popular for storing multiple megabytes of data from personal computers, notebook computers, personal digital assistants (PDAs), smart telephones, cameras, digital recorders, MP3 players, and other electronic devices. Memory cards may be used to store video data or other data needing high capacity. The number of applications for such memory cards is increasing rapidly. An example of an application is storing music downloaded from the Internet.

MultiMediaCard (MMC) is a kind of memory card having a plurality of electrical contacts (input/output terminals). MMC is available with different storage capacities, e.g., 64 megabytes. The physical and electrical specifications for MMC memories are given in "The MultiMediaCard System Specification" ("MMCA"). Version 3.3 of the MMCA specification, dated March, 2003, is incorporated herein by reference.

MMC memory has a serial interface that uses six electrical contacts, one for transfer of data, one for receiving commands and sending responses, one to receive a clock signal and three to receive power. The rate at which data can be transferred into and out of the card is limited for a given clock frequency by use of a single data contact, as opposed to transferring data in parallel through multiple contacts as done in other larger memory cards having different formats.

The data transmission speed of MMC memory is about 1 MB/sec to 2 MB/sec. However, a high speed MMC can have a data transmission speed of about 52 MB/sec.

Therefore, a need exists for a system and method for controlling a transmission speed between a host and a memory card.

SUMMARY OF THE INVENTION

According to an embodiment of the present disclosure, a memory system controls a transmission speed between a host and a memory card when the memory card is inserted in the host.

According to an embodiment of the present disclosure, a method of the memory system controls a transmission speed between a host and a memory card when the memory card is inserted in the host.

According to an embodiment of the present disclosure, a memory system sets a data bit width of data transferred between the host and the memory card.

According to an embodiment of the present disclosure, a method of the memory system sets the data bit width of data transferred between the host and the memory card.

According to an embodiment of the present disclosure, a method of a system including a host and an electronic circuit card that can be inserted into the host and electrically connected to the host comprises transferring transmission speed information from the host to the electronic circuit card upon inserting the electronic circuit card into the host, and transferring a command signal for initializing the electronic circuit card from the host to the electronic circuit card.

In a preferred embodiment, when the transmission speed of the electronic circuit card is identical to a transmission speed specified by the transmission speed information received by the electronic circuit card, a response signal is transferred from the electronic circuit card to the host.

When the response signal is received by the host, the host transfers data bit width information to the electronic circuit card.

When the host has two transmission speeds, the host changes a transmission speed if the response signal is not received from the electronic circuit card.

When the host has three or more transmission speeds, the host changes a transmission speed and transfers transmission speed information corresponding to the changed transmission speed to the electronic circuit card if the response signal is not received from the electronic circuit card.

In a preferred embodiment, the electronic circuit card is a mobile memory card.

According to an embodiment of the present disclosure, a method of a system including a host and an electronic circuit card that can be inserted into the host and electrically connected to the host comprises transferring transmission speed information from the host to the electronic circuit card upon inserting the electronic circuit card into the host, transferring a response signal from the electronic circuit card to the host when a transmission speed of the electronic circuit card is identical to a transmission speed specified by the transmission speed information received by the electronic circuit card, and transferring a command signal for initializing the electronic circuit card from the host to the electronic circuit card.

In a preferred embodiment, when a response signal is received by the host, data bit width information is transferred from the host to the electronic circuit card.

The host supports a plurality of transmission speeds.

When the response signal is not received by the host, the transmission speed of the host is changed.

According to an embodiment of the present disclosure, a method of a system including a host for supporting a plurality of transmission speeds and an electronic circuit card that can be inserted into the host and electrically connected to the host comprises transferring information corresponding to a first transmission speed from the host to the electronic circuit card upon inserting the electronic circuit card into the host, transferring a first response signal from the electronic circuit card to the host when a transmission speed of the electronic circuit card is the first transmission speed, transferring data bit width information from the host to the electronic circuit card when the first response signal is received by the host within a first predetermined time, and transferring a command signal for initializing the electronic card from the host to the electronic circuit card.

In a preferred embodiment, the transmission speed of the host is changed to a second transmission speed and information corresponding to the second transmission speed is transferred to the electronic circuit card when the first response signal is not received by the host within the first predetermined time, a second response signal is transferred from the electronic circuit card to the host when the transmission speed of the electronic circuit card is the second transmission speed, data bit width information corresponding to the second transmission speed is transferred from the host to the electronic circuit card upon the host receiving the second response signal within a second predetermined time, and a command signal for initializing the electronic circuit card is transferred from the host to the electronic circuit card.

When the second response signal is not received by the host within the second predetermined time, a transmission speed of the host is changed to a third transmission speed, and information corresponding to the third transmission speed is transferred to the electronic circuit card. A command signal for initializing the electronic circuit card from the host to the electronic circuit card is transferred.

According to an embodiment of the present disclosure, a memory system includes a host and an electronic circuit card that can be inserted into the host and electrically connected to the host. Upon inserting the electronic circuit card into the host, the host transfers transmission speed information to the electronic circuit card, and transfers a command signal for initializing the electronic circuit card.

In a preferred embodiment, the electronic circuit card includes a set block for receiving transmission speed information that is transferred from the host.

The set block transfers a response signal to the host when the electronic circuit card supports a transmission speed that corresponds to the transmission speed information transferred from the host.

The host transfers data bit width information to the electronic circuit card when the response signal is received from the electronic circuit card.

The electronic circuit card further includes a register for storing the data bit width information transferred from the host.

The host changes a transmission speed and transfers transmission speed information corresponding to the changed transmission speed when the response signal is not received.

The electronic circuit card may be electrically connected to the host and further includes at least one data input/output pin.

The transmission speed information transferred from the host is transferred through the data input/output pin to the interface circuit.

The response signal from the interface circuit is transferred through the data input/output pin to the host.

In a preferred embodiment, the electronic circuit card is a MultiMediaCard (MMC).

In a preferred embodiment, the electronic circuit card is a SecureDigital (SD) card.

In a preferred embodiment, the electronic circuit card includes a non-volatile NAND flash memory card.

BRIEF DESCRIPTION OF THE DRAWINGS

FIG. 2 shows a memory card system according to a preferred embodiment of the present disclosure.

DETAILED DESCRIPTION OF PREFERRED EMBODIMENTS

The present invention will be described more fully hereinafter with reference to the accompanying drawings in which exemplary embodiments of the invention are shown.

Figure 1A:
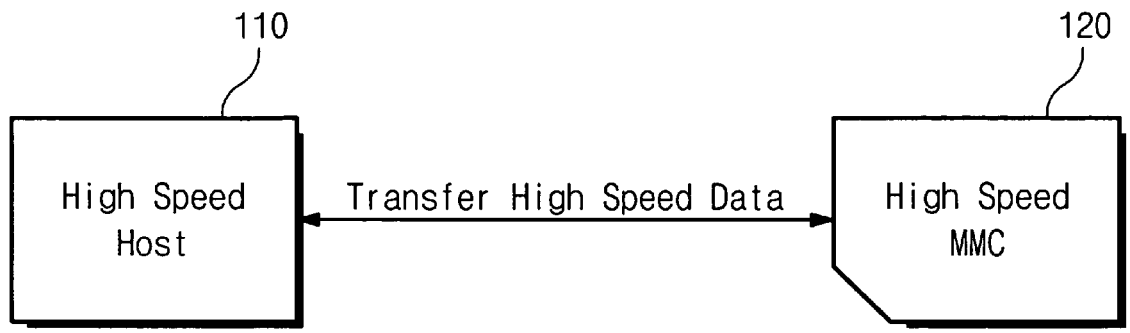
FIGS. 1A and 1B show that a data transmission speed between a host and a MMC is set according to the data transmission speed of the host on the basis of a preferred embodiment of the present disclosure.
Figure 1B:
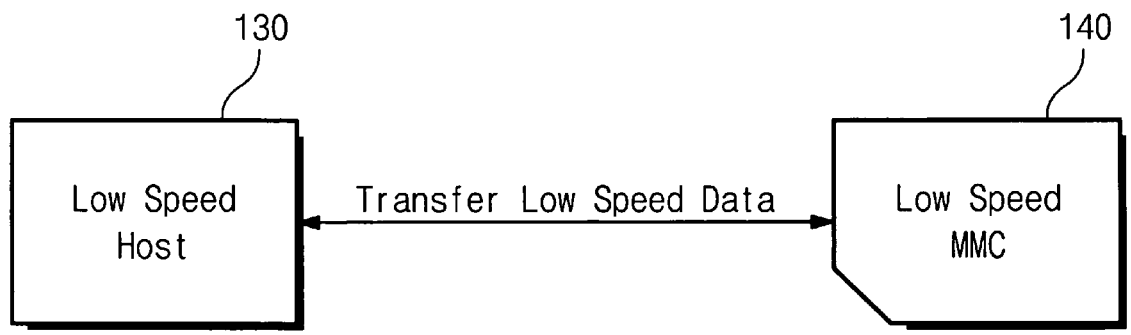

FIGS. 1A and 1B show that a data transmission speed between a host and a MMC is set according to the data transmission speed of the host on the basis of a preferred embodiment of the present disclosure. As shown in FIG. 1A, a high speed (e.g., 52 MB/sec) host 110 is connected to a high speed (e.g., 52 MB/sec) MMC 120, a transmission speed between the host 110 and a MultiMediaCard (MMC) 120 is set at the high speed. As shown in FIG. 1B, a low speed (e.g., 2 MB/sec) host 130 is connected to a high speed (e.g., 52 MB/sec) MMC 140, a transmission speed between the host 130 and the MMC 140 is set at the low speed. The MMC is an example of a memory card connected to the host. Various memory cards such as a SD card can be connected to the host.

FIG. 2 shows a memory card system according to a preferred embodiment of the present disclosure. A memory card system 200 includes a host 210 and a MMC 220. The MMC 220 includes an interface circuit 221, a memory controller 222, and a non-volatile semiconductor memory 223. The memory 223 is a NAND-type flash memory, and the memory controller 222 controls writing data to the memory 223 or reading data from the memory in response to a command language input from the outside by the interface circuit 221. The interface circuit 221 receives a command signal, a clock signal, and data, which are transferred from the host 210, and controls various elements in the MMC 220.

The MMC 220 according to a preferred embodiment of the present disclosure includes a data transmission speed between the MMC 220 and the host 210, a transmission speed for setting a bit width, and a bit width set block 224. The transmission speed and the bit width set block 224 receives transfer mode information transferred from the host 210 and transfers a response signal to the host 210. The block 224 stores bit width information transferred from the host 210 in an Extended Card Specific Data EXT_CSD register 250. The transmission speed and the bit width set block 22 will be more fully described hereinafter.

Figure 3:
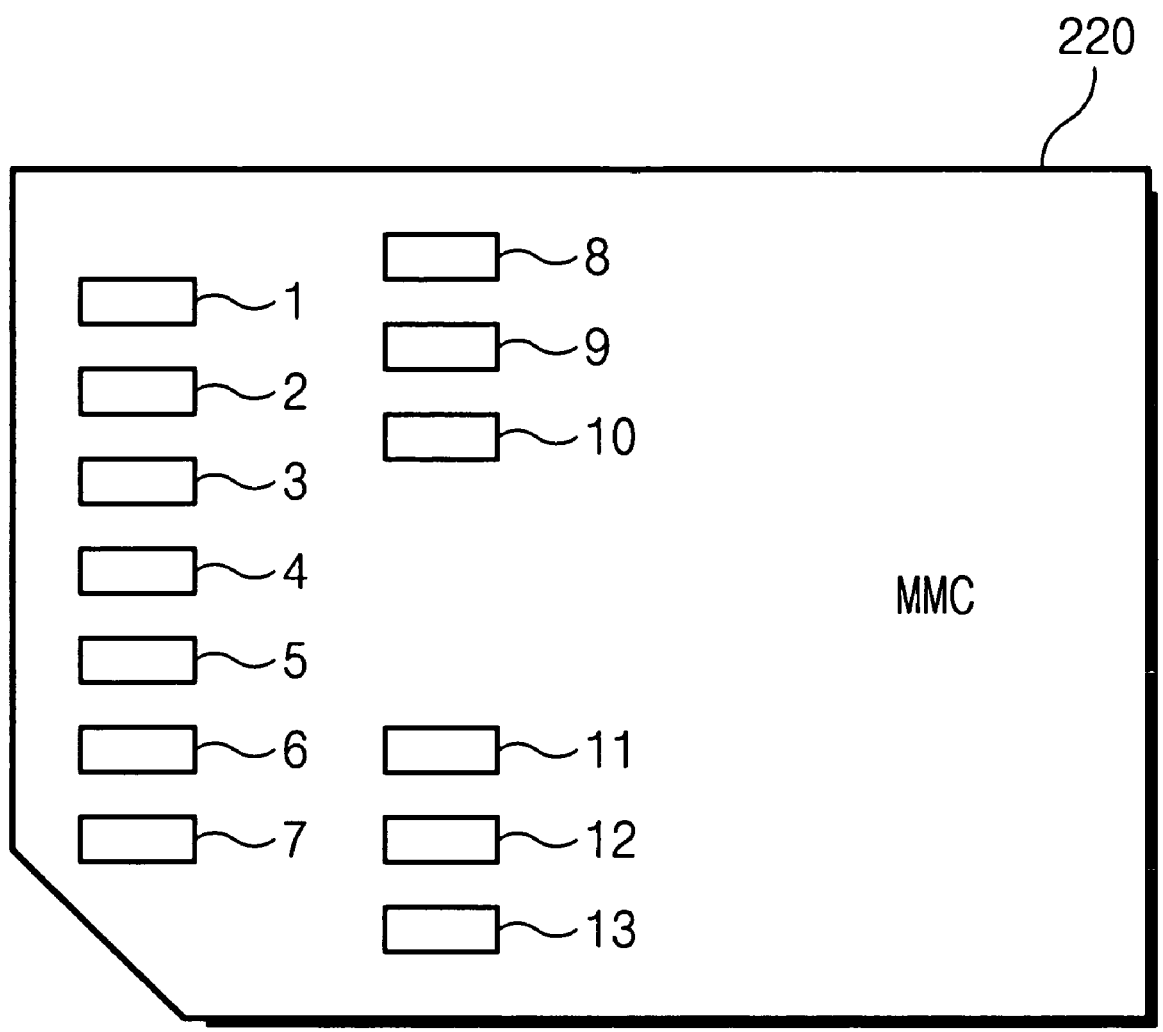
FIG. 3 shows a contact arrangement of the MMC according to a preferred embodiment of the present disclosure.

FIG. 3 shows a contact arrangement of the MMC according to a preferred embodiment of the present disclosure. The MMC 220 includes 13 contacts (1-13). The contact 2 is used to receive a command from the host 210 and transfer a response signal to the host 210. The contacts 3, 4, and 6 are used to receive power voltages VSS1, VDD, and VSS2 from the host 210. The contact 5 is used to receive a clock signal from the host 210. The contacts 1 and 7-13 are used to transfer data between the host 210 and the MMC 220. The transmission speed information transferred from the host 210 is received through the contact 7 to the MMC 220.

Figure 4A:
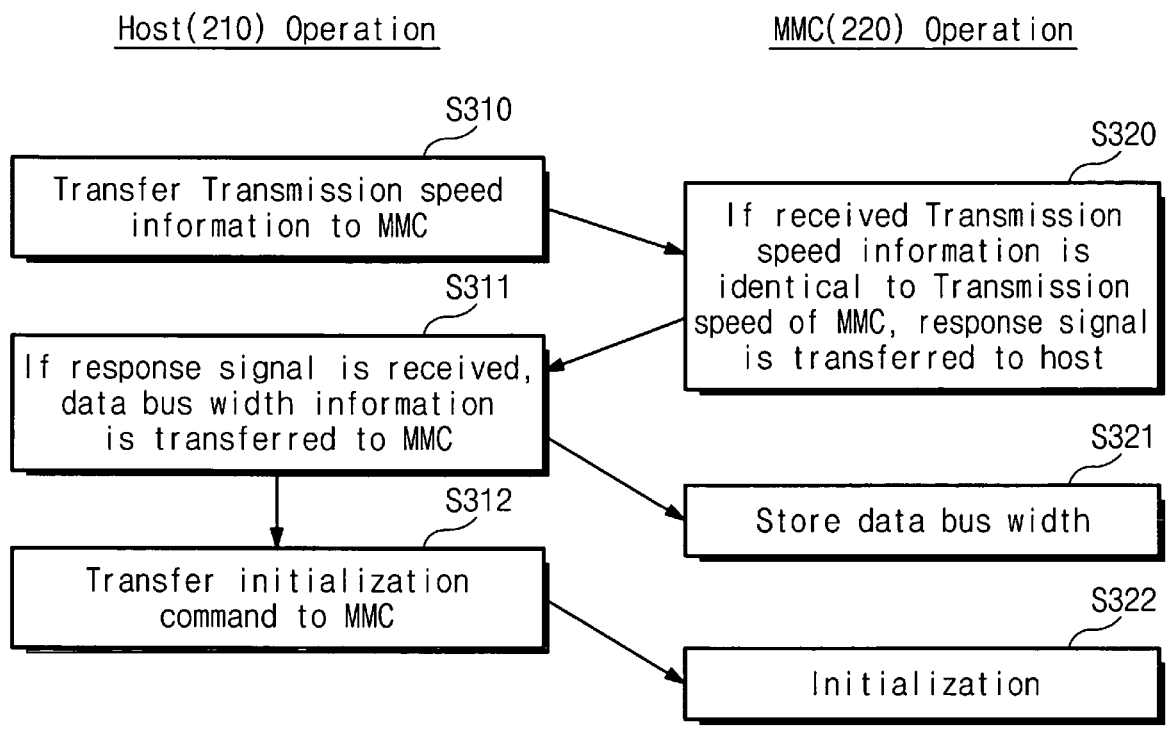
FIGS. 4A-4C show an operation sequence of the host and the MMC when the MMC is inserted in the host according to a preferred embodiment of the present disclosure.
Figure 4B:
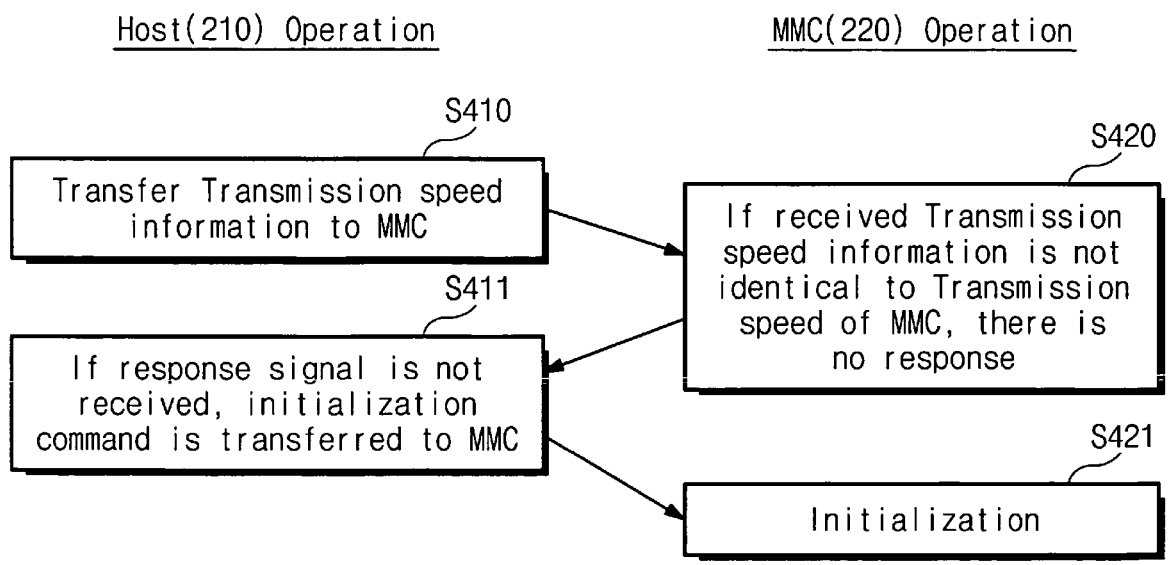
Figure 4C:
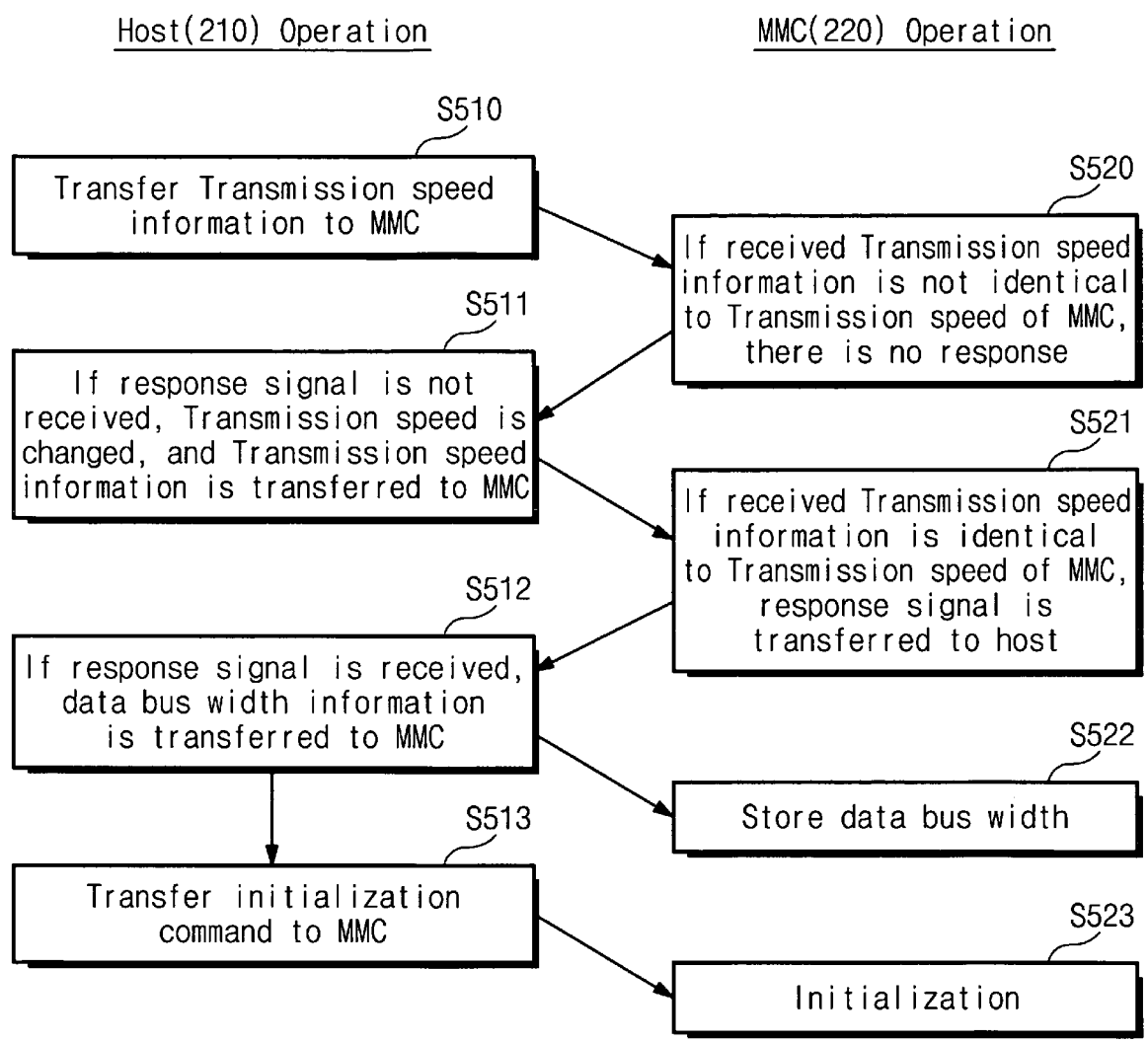
Figure 5:
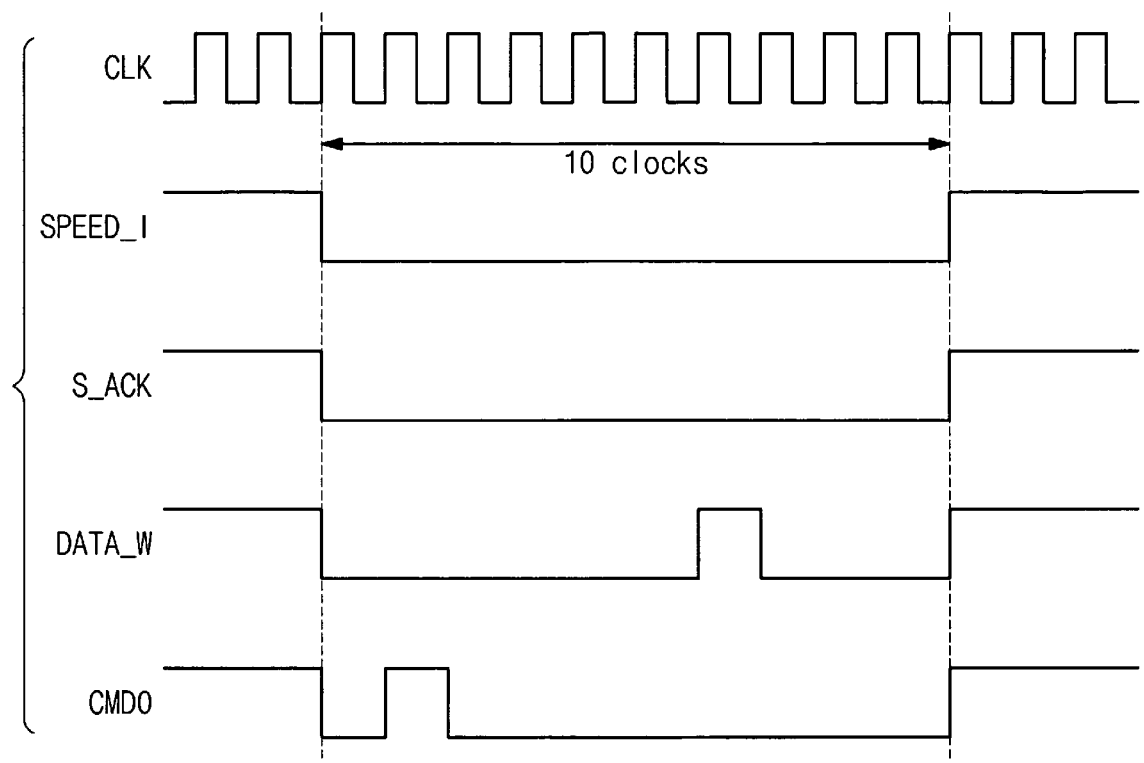
FIG. 5 shows a part of signals that are sent and received between the host and the MMC.

FIGS. 4A-4C show an operation sequence of the host and the MMC when the MMC is inserted in the host according to a preferred embodiment of the present disclosure. FIG. 5 shows a part of signals that are sent and received between the host and the MMC.

FIG. 4A shows an operation sequence of the host 210 and the MMC 220 when the MMC 220 is inserted into the host 210 where both the host 210 and MMC 220 support a high speed (e.g., 52 MB/sec). Referring to FIG. 4A, if the MMC 220 is inserted to the host 210, the host 210 drives data pins 1 and 7-13 of the MMC 220 in a high level and transfers transmission speed information SPEED_I to the MMC 220 by a data pin 7 (S310). The transmission speed information SPEED_I that is transferred to the MMC 220 by the host 210 indicates a high level transmission speed (e.g., 52 MB/sec). The transmission speed information SPEED_I is a signal that is at a low level during 10 cycles of a clock signal CLK as shown in FIG. 5. A signal waveform of the transmission speed information SPEED_I can be varied.

The MMC 220 and the bit width set block 224 receive the transmission speed information SPEED_I transferred from the host 210. If the received transmission speed information SPEED_I is identical to the transmission speed of the MMC 220, the MMC 220 and the bit width set block 224 transfer a response signal S_ACK to the host 210. As shown in FIG. 5, the response signal S_ACK is a signal that is at a low level during 10 cycles of the clock signal CLK.

Figure 6:
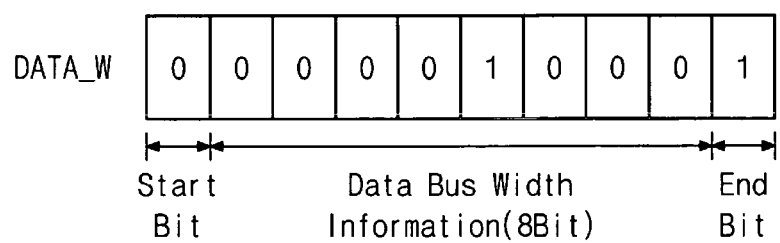
FIG. 6 shows one example of data bus width information that is transferred from the host to the MMC.

The host 210 transfers data bus width information DATA_W if the response signal S-ACK is received from the MMC 220. An example of the data bus width information DATA_W transferred from the host 210 to the MMC 220 is shown in FIG. 6.

The MMC 220 and the bit width set block 224 control the data bus width information DATA_W transferred from the host 210 to be stored in the EXT_CSD register 225 (S321).

The host 210 transfers an initialization command CMD0 to the MMC 220 (S312). The initialization command CMD0 transferred from the host 210 is input through the contact 2 of the MMC 220.

The interface 221 of the MMC 220 controls an initialization in response to the initialization CMD0 (S322). The host 210 and the MMC 220 send/receive data as accordingly to the data width, which is stored in the EXT_CSD register 225.

As previously mentioned, the memory system 200 includes the host 210 that transfers transmission speed information to the MMC 220. If the transmission speed information transferred from the host 210 is identical to the transmission speed of the MMC 220, the MMC 220 transfers a response signal to the host 210. In this manner, the transmission speed of the host 210 becomes equal to that of the MMC 220. In addition, the host 210 transfers data bit width information to the MMC 220 so that data can be transferred between the host 210 and the MMC 220.

FIG. 4B shows an operation sequence of the host 210 and the MMC 220 when the MMC 220 is inserted to the host 210, the host supports a high speed (e.g., 52 MB/sec) and a low speed (e.g., 2 MB/sec), and the MMC 220 supports the low speed (e.g., 2 MB/sec). Referring to FIG. 4B, if the MMC 220 is inserted in the host 210, the host 210 drives data pins 1 and 7-13 at a high level and transfers a transmission speed information SPEED_I corresponding to the high speed to the MMC 220 by the data pin 7. The transmission speed information SPEED_I that is transferred from the host 210 to the MMC 220 indicates a transmission speed at the high speed (e.g., 52 MB/sec). In other words, as shown in FIG. 5, the transmission speed information SPEED_I is a signal, which is in a low level during 10 cycles of the clock signal CLK.

The MMC 220 and the bit width set block 224 receive the transmission speed information SPEED_I transferred from the host 210. If the received transmission speed SPEED_I is not identical to the transmission speed of the MMC 220, the MMC 220 and the bit width set block 224 do not transfer a response to the host 210.

The host 210 transfers the transmission speed information SPEED_I. If a response signal is not received from the MMC 220 during a predetermined time, the host 210 transfers an initialization CMD0 (S411).

The interface circuit 221 of the MMC 220 controls an initialization in response to the initialization command CMD0 (S412).

If the transmission speed information SPEED_I corresponding to the high speed and transferred from the host 210 is not identical to an operation speed of the MMC 220, the host 210 changes and transfers the operation speed to a low speed (e.g., 2 MB/sec).

FIG. 4C shows an operation sequence of the host 210 and the MMC 220 when the MMC 220 is inserted to the host 210, the host supports three transmission speeds (e.g., 52 MB/sec, 2 MB/sec, and 1 B/sec), and the MMC 220 supports the low speed (e.g., 2 MB/sec). Referring to FIG. 4C, if the MMC 220 is inserted in the host 210, the host 210 drives data pins 1 and 7-13 of the MMC 220 and transfers a transmission speed information SPEED_I corresponding to a high transmission speed (e.g., 52 MB/sec) to the MMC 220 by the data pin 7 (S510).

The MMC 220 and the bit width set block 224 receive the transmission speed information SPEED_I transferred from the host 210. If the received transmission speed information SPEED_I is not identical to the transmission speed of the MMC 220, the transmission speed of the MMC 220 and the bit width set block 224 do not transfer a response signal.

The host 210 transfers the transmission speed information SPEED_I. If a response signal is not received from the MMC 220 during a predetermined time, the host 210 changes a transmission speed to a second speed (e.g., 2 MB/sec), and transfers information SPEED_I2 that corresponds to the changed transmission speed to the MMC 220. The MMC 220 and the bit width set block 224 receives the transmission speed information SPEED_I2 that is transferred from the host 210. If the received transmission speed information SPEED_I2 is identical to the transmission speed of the MMC 220, the transmission speed of the MMC 220 and the bit width set block 224 transfers a response signal S_ACK2 to the host 210. The response signal S_ACK1 corresponding to the transmission speed of 52 MB/sec is different from the response signal S_ACK2 corresponding to the transmission speed of 2 MB/sec.

If the response signal S_ACK2 is received from the MMC 220, the host 210 transfers data bus width information DATA_W to the MMC 220. The MMC 220 and the bit width set block 224 controls the data bus width information DATA_W that is transferred from the host 210 to be stored in the EXT_CSD register 225.

The host 210 transfers an initialization command CMD0 to the MMC 220 (S513).

The interface circuit 221 of the MMC 220 controls an initialization in response to the initialization command CMD0.

The host 210 sequentially transfers transmission speed information corresponding to the transmission speeds (e.g., 52 MB/sec, 2 MB/sec, and 1 MB) to the MMC 220 when the host 210 supports three kinds of transmission speeds (e.g., 52 MB/sec, 2 MB/sec, and 1 MB/sec). The MMC 220 transfers a response signal to the host 210 when transmission speed information is identical to an operation speed supported by the MMC 210 from the host 210. In this manner, an operation speed of the host 210 is identical to that of the MMC 220.

When a memory card is inserted in a host, it is possible to equalize a transmission speed between the host and the memory card.

Having described embodiments for a system and method for controlling a transmission speed between a host and a memory card, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method of a system including a host and an electronic circuit card that can be inserted into the host and electrically connected to the host, the method comprising:

transferring transmission speed information from the host to the electronic circuit card upon inserting the electronic circuit card into the host;

transferring a command signal for initializing the electronic circuit card from the host to the electronic circuit card, wherein the command signal has a transmission speed depending on whether a response signal is received from the electronic circuit card to the host in response to the transmission speed information and wherein the host changes the transmission speed to a low transmission speed when the response signal is not received from the electronic circuit card to the host and transfers the changed transmission speed information to the electronic circuit card, wherein the command signal is transferred after a pre-set time after the transferring of the transmission speed information;

transferring a response signal from the electronic circuit card to the host when the transmission speed of the electronic circuit card is identical to a transmission speed specified by the transmission speed information received by the electronic circuit card; and transferring data bit width information from the host to the electronic circuit card when the response signal is received by the host from the electronic circuit card within the pre-set time after the transferring of the transmission speed information.

2. The method of claim 1, wherein the host has at least two transmission speeds.

3. The method of claim 1, wherein the host has at least three transmission speeds.

4. The method of claim 3, wherein the electronic circuit card is a mobile memory card.

5. A memory system comprising:

a host; and an electronic circuit card that can be inserted into the host and electrically connected to the host, wherein the host transfers transmission speed information to the electronic circuit card upon inserting the electronic circuit card into the host, transferring a command signal for initializing the electronic circuit card, wherein the electronic circuit card comprises, an interface circuit for interfacing with the host, the interface circuit electrically connected to a set block for receiving transmission speed information transferred from the host, register for storing the data bit width information transferred from the host and a memory controller, wherein the set block transfers a response signal to the host when the electronic circuit card supports a transmission speed, which corresponds to a transmission speed specified by the transmission speed information transferred from the host, and wherein the host transfers data bit width information to the electronic circuit card when the response signal is received from the electronic circuit card within a pre-set time after the transferring of the transmission speed information, and wherein the host supports a plurality of data transmission speeds, and wherein the host changes a transmission speed to a low transmission speed and transfers the changed transmission speed information to the electronic circuit card when the response signal is not received from the electronic circuit card, and a memory electrically connected to the interface circuit through the memory controller.

6. The memory system of claim 5, wherein the electronic circuit card is electrically connected to the host and further includes at least one data input/output pin that is connected to the set block.

7. The memory system of claim 6, wherein the transmission speed information transferred from the host is transferred to the interface circuit by the data input/output pin.

8. The memory system of claim 7, wherein the response signal from the interface circuit is transferred to the host by the data input/output signal.

9. The memory system of claim 5, wherein the electronic circuit card is a MultiMediaCard (MMC).

10. The memory system of claim 5, wherein the electronic circuit card is a SecureDigital (SD) card.

11. The memory system of claim 9, wherein the electronic circuit card includes a non-volatile flash memory.

* * * * *